Dec. 28, 1948.  G. E. RICHARDS  2,457,397
RESILIENT SUSPENSION FOR FARM WAGONS
Filed Feb. 4, 1946
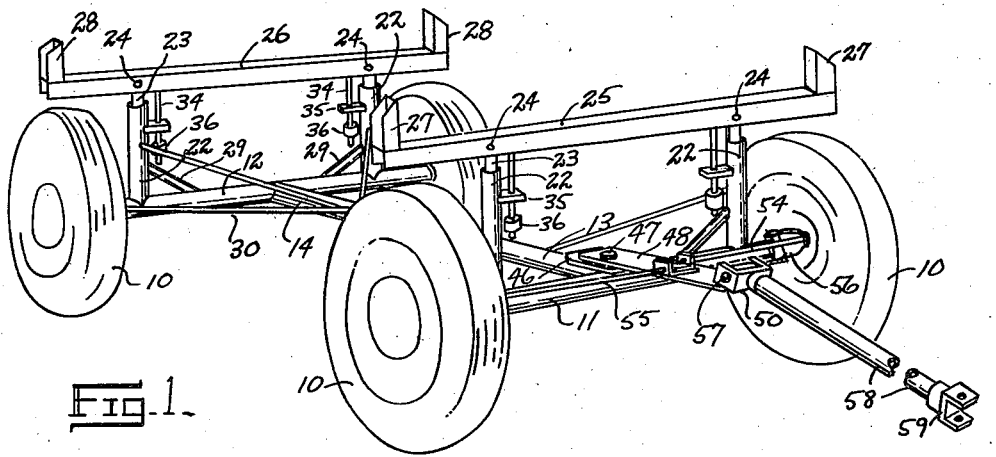
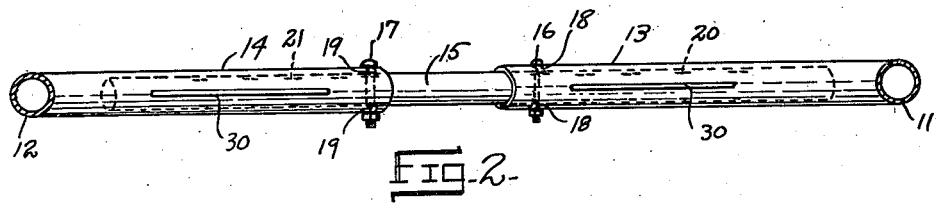
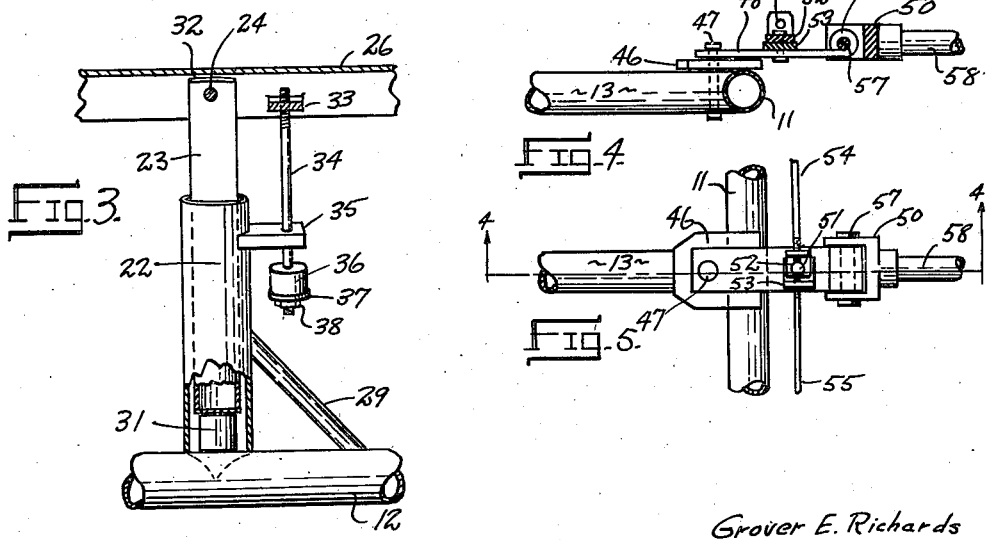
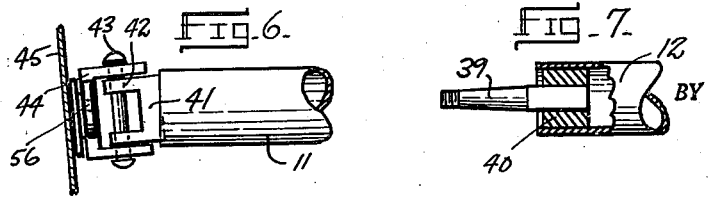
Grover E. Richards
INVENTOR.
BY W. B. Harpman
ATTORNEY Patented Dec. 28, 1948

2,457,397

UNITED STATES PATENT OFFICE 2,457,397

RESILIENT SUSPENSION FOR FARM WAGONS

Grover E. Richards, Youngstown, Ohio

Application February 4, 1946, Serial No. 645,355

2 Claims. (Cl. 280—124)

This invention relates to a vehicle and more particularly to a farm wagon.

The principal object of the invention is the provision of a farm wagon adjustable as to wheel base and bed length.

A further object of the invention is the provision of a farm wagon having a frame of welded tubular construction.

A still further object of the invention is the provision of a farm wagon incorporating novel bed suspension means.

A still further object of the invention is the provision of a farm wagon incorporating an automotive-type steering mechanism in connection with tongue means for actuating the same.

A still further object of the invention is the provision of a farm wagon including a towing tongue assembly permitting interchange of various lengths of towing tongues.

The farm wagon shown and described herein has been devised to form a practical and efficient utility wagon primarily adapted for use on farms and the like. The wagon may be moved by hitching horses or other draft animals to the same or by connecting it to a tractor or similar automotive vehicle. The wagon incorporates an all-welded tubular steel construction of relatively light weight yet durable construction. The wagon includes a telescopically arranged, longitudinal frame member so that the wheel base of the wagon may be varied at will by the simple expedient of moving one or two bolts. The bed carrying sections of the wagon are suspended with relation to the axle and frame members by novel suspension means incorporating resilient members.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:

Figure 1 is a perspective elevation of the farm wagon.

Figure 2 is an enlarged detailed elevation of the longitudinal frame member of the farm wagon.

Figure 3 is an enlarged detailed perspective elevation of one of the wagon bed suspension means employed in the farm wagon.

Figure 4 is a side elevation with parts broken away and parts in cross section illustrating a portion of the tubular frame and front axle of the farm wagon and the steering tongue mechanism.

Figure 5 is a top plan view with parts broken away and parts in cross section illustrating the steering tongue mechanism including the tie rods.

Figure 6 is an enlarged detailed elevation with parts broken away and parts in cross section illustrating the front axle spindle construction.

Figure 7 is an enlarged detailed elevation with parts broken away and parts in cross section illustrating the rear axle spindle construction.

By referring to the drawings and Figure 1 in particular it will be observed that the farm wagon is a four wheeled vehicle including wheels 10 positioned on front and rear axles 11 and 12, respectively, by means of spindles which are shown in detail in Figures 6 and 7 of the drawings. The front and rear axles 11 and 12, respectively, are connected by means of longitudinal tubular frame members 13 and 14, respectively, as illustrated in enlarged detail in Figure 2. The longitudinal tubular frame members 13 and 14 are telescopically engaged by a secondary longitudinal frame member 15, the majority of which is slidably positioned within the frame members 13 and 14. Bolts 16 and 17 engaging oppositely disposed slots 18 and 19, respectively, in the tubular members 13 and 14 also engage oppositely disposed openings 20 and 21 in the opposite ends of the secondary tubular frame member 15 so that the effective length of the wheel base of the farm wagon may be adjusted by removing the bolts 16 and 17 and moving the frame members 13 and 14 outwardly or inwardly with respect to the secondary frame member 15. Each of the tubular axles 11 and 12 is provided with vertical sleeves 22 which are welded at their lowermost ends directly to the tubular axles 11 and 12, respectively, inwardly from the outermost ends thereof a distance to provide suitable clearance from the wheels 10. The uppermost ends of the sleeves 22 are open and adapted to receive depending support members 23 which are pivoted at their uppermost ends by pivots 24 to transversely position wagon bed members 25 and 26, respectively. The outermost ends of the wagon bed members 25 and 26, respectively are preferably formed of downturned channels and are provided with upturned sections 27 and 28, respectively. The upturned sections 27 and 28 are preferably formed of sections of similar channel stock welded thereto. The sleeves 22 are braced with respect to the tubular axles 11 and 12 by means of a plurality of tubular brace members 29. The tubular axles 11 and 12 are braced with respect to the innermost ends of the longitudinal frame members 13 and 14 by means of angularly positioned brace rods 30.

In Figure 3 of the drawings the sleeves 22 are shown in enlarged cross sectional detail as are the depending support members 23. It will be observed that the lowermost ends of the depending support members 23 are closed and that a block of resilient material 31, such as rubber, is positioned immediately beneath the lowermost ends of the depending support members 23 and rest on the axle 11 or 12. The uppermost ends of the depending support members 23 are rounded, as indicated at 32, to permit the transversely positioned wagon bed members 25 and 26 to move with respect thereto at such time as the wagon is drawn over even ground.

In order that the upward movement of the wagon bed members 25 and 26 may be limited, cross pieces 33 are positioned in the downturned channels from which the wagon bed members 25 and 26 are formed and depending rods 34 are affixed thereto. The depending rods 34 also engage and pass through brackets 35, one of which is formed on the side of each of the sleeves 22 of the farm wagon. The lowermost ends of the depending rods 34 each carry a block of resilient material 36; such as rubber, which is positioned on a supporting disc 37 which in turn is held on the depending rods 34 by means of a bolt 38 engaging a threaded end section thereof.

It will thus be seen that the upward and downward movement of the wagon bed members 25 and 26 with respect to the axles 11 and 12, or the opposite of such movement, is provided for by the two resilient blocks 31 and 36. The block 31 normally supports the weight of the wagon bed members 25 and 26 and the weight of any load thereon. The other resilient block 36 acts as a shock absorber and upward travel limiting member. This construction, in connection with the slots 18 and 19 in the frame members 13 and 14 in which the bolts 16 and 17 are positioned, provides for sufficient tilting motion of the axles 11 and 12 as will occur when the wagon is drawn over an even ground. The rear axle 12 is of tubular material and, as may be seen in Figure 7 of the drawings, is provided with wheel carrying spindles 39 which are positioned in a section of material 40 which in turn is welded to the interior surface of the tubular axle 12 thereby forming a rigid and durable spindle construction.

The front wheels 10 are carried on pivoted spindles so that they may be steered. As illustrated in Figure 6, the tubular front axle 11 has a bracket 41 welded directly in the end thereof and the bracket 41, having drilled openings 42 therein for the reception of a conventional king pin 43 which also passes through a bifurcated end section of a steering spindle 44, in which in turn directly supports a wheel 45, a section of which is shown in Figure 6 of the drawings.

In order that the front wheels 10, which are pivotally affixed to the tubular axle 11 by the construction heretofore described in connection with Figure 6 of the drawings, may be steered, a steering and towing apparatus is provided and is illustrated in Figure 1 of the drawings as well as in enlarged detail in Figures 4 and 5 of the drawings.

By referring now to Figures 4 and 5 of the drawings it will be seen that the front end of the tubular frame 13 adjacent its point of connection with the tubular front axle 11 supports a plate 46. The plate 46 is preferably welded to both the tubular frame 13 and the axle 11 and carries a heavy pivot 47 through which the farm wagon is towed. The pivot 47 preferably extends downwardly through the plate 47 and through the tubular frame 13. The pivot 47 pivotally affixes a steering tongue 48 to the wagon structure, the foremost end of the steering tongue 48 is formed into an eyelet 49 which provides means for attaching a coupling such as that indicated by the numeral 50 thereto. Between the eyelet 49 and the pivot 47 a secondary pivot 51 pivotally affixes in oppositely disposed relation a pair of L-shaped brackets 52 and 53 to the steering tongue 48. These L-shaped brackets 52 and 53 have threaded openings formed therein for the reception in the innermost ends of a pair of tie rods 54 and 55, respectively. The outermost ends of the tie rods 54 and 55, (shown in Figure 1 of the drawings) are affixed to forwardly and upwardly extending brackets 56 which are formed as parts of the steering spindles 44 as is customary in tie rod and steering spindle constructions. Pivotal connections are provided between the tie rods and the brackets 56 on the steering spindles 44 so that the tie rods may remain in approximately transverse extending position during their transverse movement when the wheels 10 are turned from side to side by the movement of the steering tongue 48.

By again referring to Figure 1 of the drawings it will be seen that the coupling 50 is affixed to the eyelet 49 on the front end of the steering tongue 48 by means of a pivot pin 57 and that the coupling 50 carries a threaded socket in which one end of a tubular towing tongue 58 is threadably engaged. This construction is illustrated in enlarged detail in Figures 4 and 5. The opposite or foremost end of the towing tongue 58 is threadably engaged in a threaded socket of a coupling 59 which is turned at right angles with respect to the coupling 50 so that it may be connected to a towing bracket on a vehicle.

It will thus be seen that a farm wagon has been disclosed which incorporates several novel points of construction and which features enable the farm wagon to be economically mass produced of readily available, inexpensive materials so that the over-all cost of the wagon is relatively low.

Having thus described my invention, what I claim is:

1. In a farm wagon including wheels and axles and frame means spacing the said axles, transversely positioned wagon bed frames located over the said axles and wheels, and means supporting the said wagon bed frames with respect to the said axles, said means including a plurality of sleeve members vertically positioned on the said axles and slidably engaging a plurality of depending support members affixed on said wagon bed frames, resilient members in each of the said sleeve members on the said axles, the said depending support members normally resting on the said resilient means, and means for limiting the upward travel of the said depending means, said means including brackets formed on the said guide means, and depending headed rods affixed to the said wagon bed frames and passing through openings in the said brackets, and resilient members positioned on the said depending rods below the said brackets.

2. In a farm wagon including wheels and axles and frame means spacing the said axles, transversely positioned wagon bed frames located over the said axles and wheels, and means supporting the said wagon bed frames with respect to the said axles, said means including a plurality of guide members positioned vertically on the said axles and a plurality of depending support members affixed on the said wagon bed frames and slidably engaging said guide members, resilient members between the said guide members and the said support members, and means for limiting the upper travel of the said depending support members, said means including brackets formed on the said guide members, and depending rods affixed to the said wagon bed frames and passing through openings in the said brackets, and resilient members positioned on the said depending rods below the said brackets, and means on said rods for retaining the said resilient members thereon.

GROVER E. RICHARDS.

REFERENCES CITED

The following references are of record in the file of this patent:

UNITED STATES PATENTS

| Number | Name | Date |
|---|---|---|
| 915,326 | Beatty | Mar. 16, 1909 |
| 931,990 | Brewster | Aug. 24, 1909 |
| 1,351,641 | Greer | Aug. 31, 1920 |
| 1,409,294 | Hatashita et al. | Mar. 14, 1922 |
| 2,030,263 | Mercer | Feb. 11, 1936 |
| 2,047,206 | Knapp | July 14, 1936 |
| 2,135,227 | Voorhees | Nov. 1, 1938 |
| 2,183,682 | Kudrna | Dec. 19, 1939 |
| 2,320,189 | McNamara | May 25, 1943 |
| 2,342,618 | Thieman | Feb. 22, 1944 |
| 2,371,835 | McNamara | Mar. 20, 1945 |